Jan. 9, 1968   R. J. DITLINGER   3,362,252
REDUNDANT CONNECTING LINK
Filed Oct. 21, 1965   3 Sheets-Sheet 1

INVENTOR.
RICHARD J. DITLINGER
BY
*Richard G. Geib*
ATTORNEY

Jan. 9, 1968     R. J. DITLINGER     3,362,252
REDUNDANT CONNECTING LINK
Filed Oct. 21, 1965     3 Sheets-Sheet 2
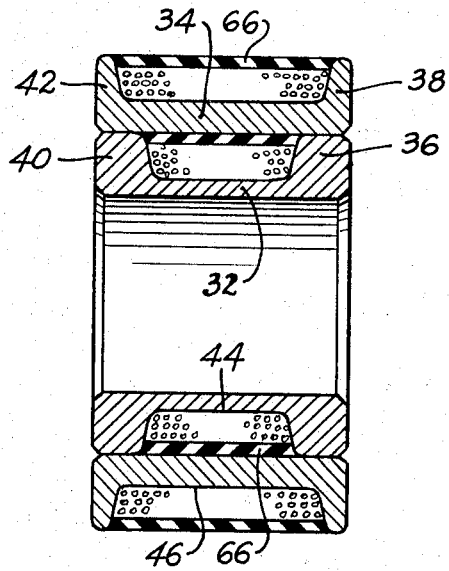
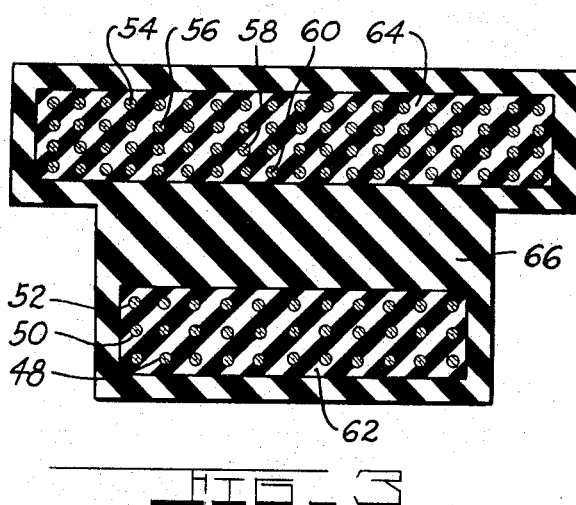
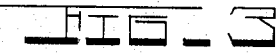
INVENTOR.
RICHARD J. DITLINGER.
BY
*Richard G. Geib*
ATTORNEY.

Jan. 9, 1968     R. J. DITLINGER     3,362,252
REDUNDANT CONNECTING LINK
Filed Oct. 21, 1965     3 Sheets-Sheet 3
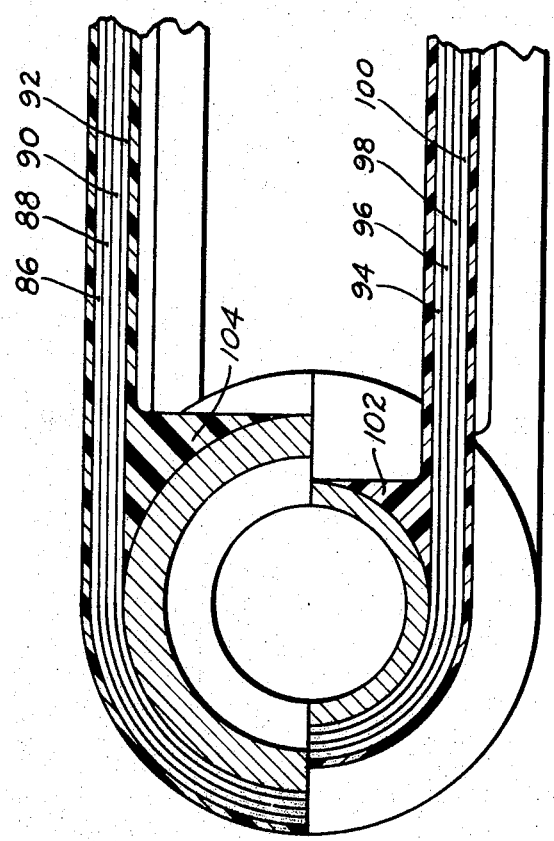
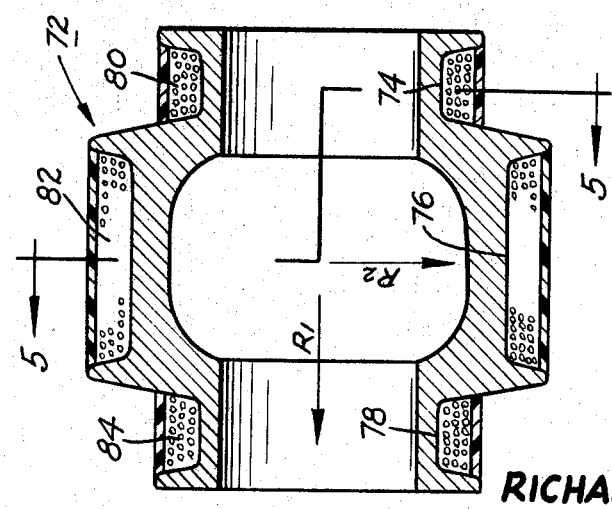
INVENTOR.
RICHARD J. DITLINGER.
BY
ATTORNEY.

United States Patent Office 3,362,252
Patented Jan. 9, 1968

3,362,252
REDUNDANT CONNECTING LINK
Richard J. Ditlinger, South Bend, Ind., assignor to The
Bendix Corporation, a corporation of Delaware
Filed Oct. 21, 1965, Ser. No. 500,416
8 Claims. (Cl. 74—579)

ABSTRACT OF THE DISCLOSURE

A connecting link having separate laminations forming separate endless load carrying layers about end fitting means constructed to maintain separate load transmission paths for said layers such that failure in one layer will not propagate failure in the other layer(s).

This invention relates to a connecting means for carrying centrifugal and torsional loading such as is utilized in connecting a helicopter rotor to a helicopter blade.

It is a principal object of this invention to provide a connecting means for spaced members from a lamination of a band of parallel filaments that is light weight and has increased service life as respects prior art devices.

It is a further object of this invention to provide a connecting means from a lamination as aforementioned from a primary band of parallel filaments and a secondary band of parallel filaments having fail-safe characteristics.

Still another object of this invention is to provide a connecting means as aforementioned having an inner lamination of bands of filaments bonded in a parallel arrangement and an outer lamination of bands of filaments bonded in a parallel relationship.

Yet another object of this invention is to provide a connecting means as aforementioned wherein the laminations are encapsulated and bonded to means for joining the connecting means to surrounding structure.

A still more particular object of this invention is to provide a connecting means of the aforementioned type wherein the inner and outer laminations are located on substantially the same radius from the center of the means used to join the connecting means to the surrounding structure.

Other objects and advantages of this invention will be apparent from the following description of the drawings in which:

FIGURE 2 is a cross sectional view of the connecting means of FIGURE 1 taken along the lines 2—2 thereof;

FIGURE 3 is a cross sectional enlarged view of the connecting means of FIGURE 1 taken along the sectional lines 3—3 thereof;

FIGURE 4 is a cross sectional end view of an end fitting for a connecting means in accordance with the principles of this invention; and FIGURE 5 is a cross sectional plan view of the connecting means utilized with the end fitting of FIGURE 4 and taken along the lines 5—5 thereof.

Figure 1:
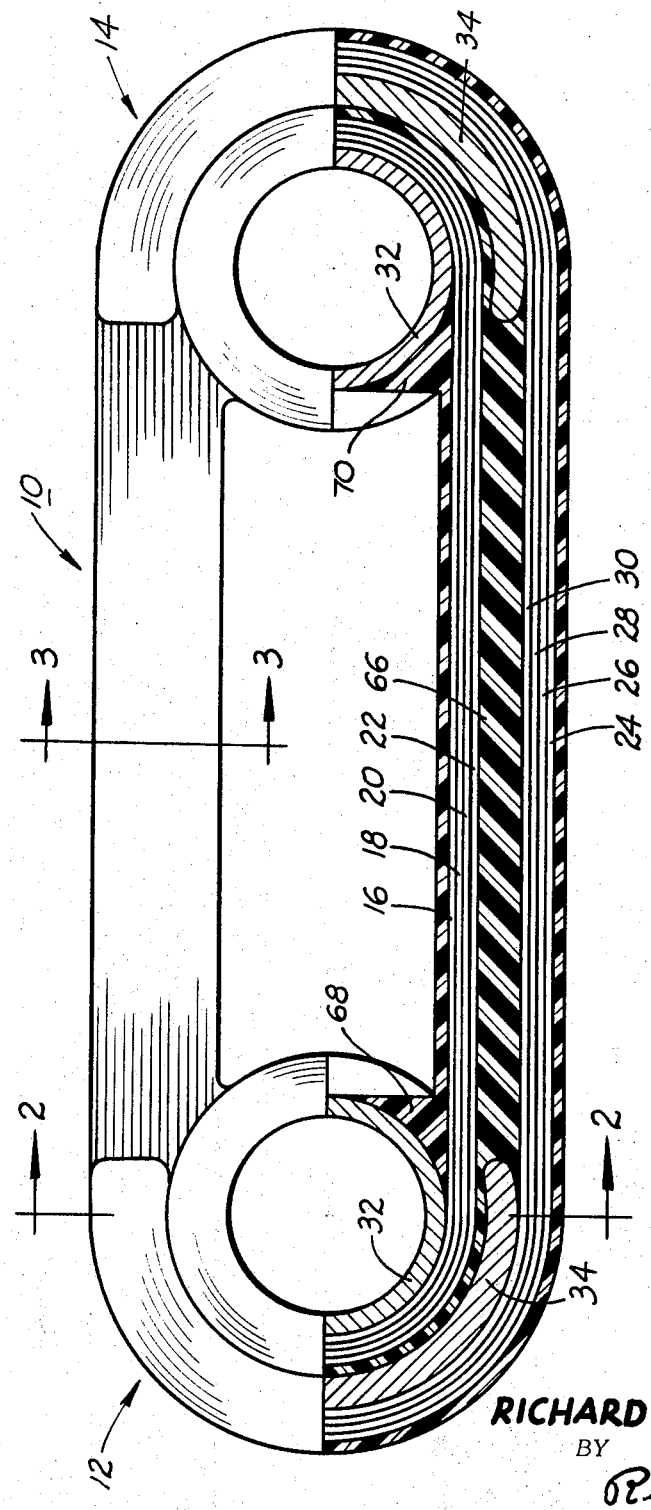
FIGURE 1 shows a cross sectional plan form of a connecting means in accordance with the principles of this invention.

In most connecting means of the type which that of this invention intends to improve upon, they are known to consist essentially of a block of suitable resilient or elastic material, such as rubber vulcanized in the usual manner, having openings at each end thereof to join the connecting means to surrounding structure. It is further known that in such blocks, reinforcing means have been looped around the block and the spaced openings therethrough to limit or control the degree of stretch of the connecting means or link.

This invention is considered to depart from these teachings in a novel manner by, generally speaking, utilizing a lamination of a band of filaments that are bonded in parallel relationship by a resilient substance that are wrapped around appropriate end fittings and bonded thereto in an endless type structure that is of integral construction.

More particularly, and with reference now to FIGURE 1, there is shown a connecting means 10 having a pair of end fittings 12 and 14 around which a plurality of laminations of bands of filaments 16, 18, 20, 22, 24, 26, 28 and 30 are wrapped to form the connecting means or link 10.

In more detail, the end fittings 12 and 14 comprise an inner bushing 32 and an outer bushing 34 which may be more particularly seen with reference to FIGURE 2 to include upper flanges 36 and 38 and lower flanges 40 and 42 prescribing cavities 44 and 46 for the receipt of the bands of filaments wrapped therearound. The inner bushing 32 is centrally drilled to receive a pin or bolt to join the ends of the link 10 to the surrounding structure.

As may be further observed from FIGURE 2, the outer bushing 34 bears upon a significant portion of the upper and lower flange 36 and 40, respectively, of the inner bushing 32 in order to provide a direct load transmitting path to the structure to which it is connected from the outer bands 24, 26, 28 and 30 without loading the inner bands 16, 18, 20 and 22. This eliminates loading of the inner bands by the outer bands. This bearing relationship between the bushings 32 and 34 is maintained by the outer laminations being tightly wrapped into the cavity 46 of the outer bushing. Furthermore, it has been considered to provide washers bearing on upper flanges 36 and 38 as well as lower flanges 40 and 42 to prevent separation of the bushings 32 and 34 when the connecting means or link 10 is assembled to surrounding structure.

With particular reference now to the enlarged cross section of the lamination portion of the link 10, the reader's attention is directed to FIGURE 3 showing the same to consist of a plurality of parallel filaments 48, 50 and 52 in the inner laminations formed of bands such as 16, 18 and 20, respectively; and filaments 54, 56, 58 and 60 in the outer lamination of bands such as 24, 26, 28 and 30, respectively. These aforementioned filaments in both the inner and outer laminations are prior to wrapping around the end fittings coated with a resilient substance such as by any known process of painting, dipping etc. such as a polyurethane compound having a thermosetting characteristic. Furthermore, the polyurethane coating for each of the filaments 48 through 60 is such that it will provide an integral assembly of the resilient substances 62 and 64 for the inner and outer laminations of filaments that will bond the filaments 48 through 60, respectively, in parallel arrangement and provide a cushion between the respective filaments when they are undergoing loading so that one filament will not come into contact with another filament. This cushion reduces intrafilament abrasion and eliminates the creation of localized points of stresses in the respective filaments. This homogeneous complexion for the filaments and resilient substances 62 and 64 can be accomplished by curing after wrapping around the respective end fittings. However, prior to this, and in order to aid in maintaining the location of the inner and outer laminations with respect to each other, the entire link assembly may be dipped in a pot containing the resilient substance, which is in effect a low tensile modular type compound, so as to encapsulate the laminations, as at 66 and fill the space between the inner and outer laminations that exist between the end fittings 12 and 14. It should be noted that upon dipping, the link 10 in the resilient substance the filler 66 will tend to fill the void between the side portions of the link 10 and the two end fittings 12 and 14.

In order to eliminate excess weight for the link 10 the encapsulated coating 66 may be partially removed from the void that it fills between the side portions of the link 10. However, adjacent each of the end fittings or bushings 32 this coating 66 bonds to the body of the bushing as at 68 and 70 to further locate the bushings with respect to each other and provide a means for transference of limited compressive loading from one bushing to the other.

The coating 66 is also left intact near the bushing to provide torsional stiffening of the laminated connecting means near the bushing. This provides a more gradual transition from a region of low torsional deflection at the bushing to a region of high torsional deflection such as exists in the length of the coupling between the bushings. Thus, in the preferred form we would leave the portions 68 and 70 attached to the bushings and only remove the unnecessary filler in the center regions of the link 10 to form an annular type connecting means.

Now with respect to FIGURE 4, there is shown another form of end fitting 72 constructed to have an upper cavity 74, an intermediate cavity 76 and a lower cavity 78 for the receipt of an upper, intermediate and lower lamination of a band of filaments 80, 82 and 84, respectively. These laminations include in the upper and lower forms a plurality of bands 86, 88, 90 and 92 similar to the band aforedescribed and in the intermediate lamination a plurality of bands 94, 96, 98 and 100 also similar to that aforedescribed. Furthermore, each of the upper, intermediate and lower laminations are encapsulated by the resilient substance aforedescribed to provide a bond, as at 102 and 104 to the bushing 72 and enclose the respective bands. (See FIGURE 5.)

It should be noted that the bushing design presented by FIGURES 4 and 5 permits the location of the upper and lower laminations and the location of the intermediate lamination of bands of bonded parallel filaments at substantially the same radius from the center of the bushings. This arrangement reduces intrafilament tensile stress differentials caused by twisting thereby reducing the tendency for intrafilament delamination when the connecting means is undergoing torsional loading. This form of separation of the lamination reduces possibilities of catastrophic failure propagation. Furthermore, this type of connecting means would allow an easier visual detection of a failure in any one of the laminations than would be permissible with respect to that of FIGURE 1 wherein the inner and outer laminations are encapsulated and joined together by the resilient substance 66.

As aforementioned, each of the filaments, which may be wire, Fiberglas, etc., will be coated prior to wrapping with a liquid urethane which upon curing will provide a homogeneous construction. It is to be noted that the amount of coating upon each of the wires will determine the amount of cushioning substance between each of the filaments or wires and thereby control the stretchiness of the connecting means. It has been further contemplated to compound with a certain portion of molybdenum disulfide ($MoS_2$). With this constituent added to the urethane, and especially when considering the utilization of wires as the filaments, chafing and fretting corrosion between the wires is prevented.

When a connecting means in accordance with the above description is joined with surrounding structure, the narrower inner lamination due to its higher spring rate will be subjected to higher loadings and no doubt will provide the means for connecting the surrounding structure until failure thereof. However, due to the addition of the outer lamination, if the inner lamination fails, the failure will be of little consequence in that the outer lamination will carry the load from the surorunding structure.

One use of the connecting means has been as a helicopter tension-torsion tie bar connecting the helicopter rotor and blade. In this arrangement the higher spring rate of the inner lamination will mean that it will carry proportionally higher loading than the outer lamination. Thus, the life cycle of the inner lamination is shorter than the outer lamination. However, as the inner lamination fails the outer lamination takes over. In this instance the longitudinal spring rate of the assembly changes to signal the helicopter pilot of a failure. As the outer lamination is now fully effective there is provided a fail-safe coupling to allow the pilot to get back to his base or land the helicopter.

It should be noted that with either type of construction broken filaments during assembly will be of no effect. The filler material will transfer load to the adjacent filaments. Thus, there are enough filaments in the band and the intrafilament shear bond will transfer loads so that the effect will be that of an assembly of continuous filaments.

In that the foregoing description is but merely illustrative of forms for practicing my invention, it is not intended to limit the scope of the invention to the description. Rather, it is intended that the scope of this invention be contained by the appended claims.

I claim:
1. A connecting means comprising:
   a pair of annular bushings each of which has upper and lower flanges defining a cavity therebetween;
   a first lamination of a band of filaments including individual parallel filaments each of which is coated with a resilient substance to separate the individual filaments, which resilient substance bonds the individual filaments in parallel alignment, said first lamination having a width substantially equal to that of the cavity between the flanges of said bushings, said first lamination being wrapped in layers around said annular bushings and bonded thereto in an endless structure by said resilient substance;
   a pair of semi-circular bushings overlying said layers of said first lamination about said annular bushings, said semi-circular bushings bearing on said annular bushings;
   a second lamination of a band of filaments including individual parallel filaments separated and bonded together by a resilient substance, said second lamination being wrapped in layers around said semi-circular bushings and bonded thereto in an endless structure by said resilient substance;
   a low tensile modular filler encapsulating the layers of said first and second laminations and locating same with respect to each other and said annular and semi-circular bushings.

2. A connecting means according to claim 1 wherein said semi-circular bushing includes a pair of flanges defining a cavity of greater width than the cavity of said annular bushings.

3. A connecting means according to claim 2 wherein said semi-circular bushings are bonded to said first lamination by said resilient substance.

4. A connecting means according to claim 3 wherein said resilient substance includes a corrosion inhibitor.

5. A connecting means including a pair of end fittings arranged at spaced intervals and a means to join said end fittings comprising:
   a first lamination of a band of filaments including individual, parallel filaments each of which is coated with a resilient substance to separate and hold the parallel alignment of said filaments, said first lamination being wrapped around said end fittings to form at least one layer of said first band of filaments enclosing said end fittings;
   a semi-circular spacer means operatively connected to said end fittings and overlying said first lamination layer around each of said end fittings;
   a second lamination of a band of filaments including individual parallel filaments each of which is coated with a resilient substance to separate and hold the parallel alignment of said filaments, said second lamination enclosing said layer of said first band with at least one layer of said second lamination and overlying said semi-circular spacer means to be laterally spaced from said layer of said first band; and a low tensile modular filler encapusulating said first and second bands of filaments and locating same with respect to said end fittings and said spacer means.

6. A connecting means including:

a pair of end fittings having each first and second cavities; and a means to join said end fittings in an endless structure, said means comprising;

a first lamination of a band of filaments including individual, parallel filaments each of which is coated with a resilient substance to separate and bond said filaments in a parallel relationship, said first lamination being wrapped around said end fittings within said first cavities thereof to space said end fittings by a first layer therearound;

a second lamination of a band of filaments including individual, parallel filaments each of which is coated with a resilient substance to separate and bond said filaments in a parallel relationship, said second lamination being longitudinally spaced from said first lamination to reduce failure propagation, said second lamination being longitudinally spaced from said first lamination to reduce failure propagation, said second lamination being also wrapped around said end fittings within said second cavities thereof whereby at least one other layer encircles said end fittings such that load transmission path of said other layer to the end fittings is independent of the load transmission path of said first layer to the end fittings; and a low tensile modular substance encapsulating said first layer and said other layer and bonding them to said end fittings.

7. A connecting means according to claim 6 wherein said second lamination includes a layer above and a layer below said first lamination on substantially the same radius of rotation of said end fittings as said first lamination to provide easy detection of failure visually and to provide functional warning by changing the spring rate of the assembly.

8. A connecting means according to claim 7 wherein said end fittings' first cavity for said first lamination and said second cavity for said second lamination are on substantially the same radius from the center of said end fittings.

References Cited

UNITED STATES PATENTS

| | | | |
|---|---|---|---|
| 1,759,356 | 5/1930 | Kattiwinkel | 64—12 |
| 2,073,852 | 3/1937 | Radford | 64—12 |
| 3,279,278 | 10/1966 | Eldred | 74—579 |

FRED C. MATTERN, JR., *Primary Examiner.*

W. S. RATLIFF, *Assistant Examiner.*